(12) United States Patent
Nebel et al.

(10) Patent No.: US 9,376,086 B2
(45) Date of Patent: Jun. 28, 2016

(54) AIRBAG MODULE WITH AN ADAPTIVE INFLUENCING DEVICE

(71) Applicant: Autoliv Development AB, Vårgårda (SE)

(72) Inventors: Raimund Nebel, Obermeitingen (DE); Nico Wallat, München (DE); Zang Holger, Bergkirchen (DE); Roland Peiz, Hilgertshausen (DE); Alexander Rottach, München (DE); Jürgen Knauss, Obermichelbach (DE); Andreas Förge, München (DE); Wolfgang Drössler, Gröbenzell (DE); Jens Hoffmann, Aschaffenburg (DE); Marcus Weber, Untertheres (DE); Michael Burger, Karlsfeld (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/422,286

(22) PCT Filed: Aug. 12, 2013

(86) PCT No.: PCT/EP2013/002412
§ 371 (c)(1),
(2) Date: Feb. 18, 2015

(87) PCT Pub. No.: WO2014/029473
PCT Pub. Date: Feb. 27, 2014

(65) Prior Publication Data
US 2015/0239424 A1      Aug. 27, 2015

(30) Foreign Application Priority Data

Aug. 18, 2012   (DE) .......................... 10 2012 016 460

(51) Int. Cl.
*B60R 21/233*      (2006.01)
*B60R 21/2338*    (2011.01)
(Continued)

(52) U.S. Cl.
CPC ............. *B60R 21/263* (2013.01); *B60R 21/233* (2013.01); *B60R 21/239* (2013.01);
(Continued)

(58) Field of Classification Search
CPC   B60R 21/233; B60R 21/2338; B60R 21/239; B60R 21/263; B60R 2021/23107; B60R 2021/23332; B60R 2021/23384; B60R 2021/2395; B60R 2021/26058
See application file for complete search history.

(56) References Cited

U.S. PATENT DOCUMENTS 5,887,894 A * 3/1999  Castagner ............. B60R 21/217
                                                                  280/735
6,513,835 B2 * 2/2003  Thomas ................ B60R 21/216
                                                                  280/736

(Continued)

FOREIGN PATENT DOCUMENTS

DE   10 2005 039 418 A1   3/2007
DE   10 2006 051 552 A1   5/2008
(Continued)

OTHER PUBLICATIONS

PCT International Search Report—Nov. 21, 2013.
(Continued)

*Primary Examiner* — Laura Freedman
(74) *Attorney, Agent, or Firm* — Brinks Gilson & Lione (57) ABSTRACT

An airbag module having a first shell (10) forming a first gas chamber (GI), a first inflator for the first gas chamber (GI), an adaptive influencing device for influencing the ventilation or shape of the first gas chamber (GI), and an actuation unit (40) for the influencing device. The actuation device (40) has a second shell (44) forming a second gas chamber (G2), and a gas source. The state of the influencing device changing upon actuating the gas source. A tensioning element having a first end (62) is coupled to the adaptive influencing device or forms the device, and a second end (64) is coupled to the second shell (44) when the second gas chamber (G2) is not filled and is decoupled from the second shell (44) when the second gas chamber (G2) is filled.

20 Claims, 10 Drawing Sheets

(51) Int. Cl.
- *B60R 21/239* (2006.01)
- *B60R 21/263* (2011.01)
- B60R 21/231 (2011.01)
- B60R 21/26 (2011.01)

(52) U.S. Cl.
CPC ..... *B60R21/2338* (2013.01); *B60R 2021/2395* (2013.01); *B60R 2021/23107* (2013.01); *B60R 2021/23332* (2013.01); *B60R 2021/23384* (2013.01); *B60R 2021/26058* (2013.01)

(56) References Cited

U.S. PATENT DOCUMENTS

| | | | | |
|---|---|---|---|---|
| 6,561,545 | B2 * | 5/2003 | Greib | B60R 21/233 280/735 |
| 6,616,184 | B2 * | 9/2003 | Fischer | B60R 21/205 280/735 |
| 6,648,371 | B2 | 11/2003 | Vendely et al. | |
| 6,832,778 | B2 * | 12/2004 | Pinsenschaum | B60R 21/233 280/739 |
| 7,017,945 | B2 * | 3/2006 | DePottey | F42B 39/20 280/739 |
| 7,240,917 | B2 | 7/2007 | Fogle, Jr. et al. | |
| 7,275,763 | B2 * | 10/2007 | Thomas | B60R 21/276 280/736 |
| 7,347,450 | B2 | 3/2008 | Williams et al. | |
| 7,448,646 | B2 | 11/2008 | Hall et al. | |
| 7,552,942 | B2 | 6/2009 | Fischer et al. | |
| 7,614,652 | B2 | 11/2009 | Aoki | |
| 7,614,653 | B2 | 11/2009 | Rose et al. | |
| 7,614,654 | B2 | 11/2009 | Williams | |
| 7,690,683 | B2 * | 4/2010 | Parks | B60R 21/239 280/739 |
| 7,722,080 | B2 | 5/2010 | Rose et al. | |
| 7,748,732 | B2 | 7/2010 | Sella et al. | |
| 7,784,828 | B2 * | 8/2010 | Matsu | B60R 21/233 280/739 |
| 7,789,423 | B2 | 9/2010 | Kim | |
| 7,845,678 | B2 * | 12/2010 | Pausch | B60R 21/2338 280/735 |
| 8,191,925 | B2 * | 6/2012 | Williams | B60R 21/2338 280/739 |
| 8,322,748 | B2 * | 12/2012 | Abe | B60R 21/2338 280/730.2 |
| 8,353,525 | B2 * | 1/2013 | Parks | B60R 21/2338 280/728.2 |
| 8,388,021 | B2 * | 3/2013 | Mitsuo | B60R 21/2338 280/728.2 |
| 8,602,453 | B1 * | 12/2013 | Stevens | B60R 21/2338 280/743.2 |
| 8,608,197 | B2 * | 12/2013 | Eckert | B60R 21/239 280/728.2 |
| 8,646,808 | B2 * | 2/2014 | Williams | B60R 21/239 280/739 |
| 8,777,260 | B2 * | 7/2014 | Kranzle | B60R 21/217 280/739 |
| 2004/0017069 | A1 | 1/2004 | Fischer | |
| 2004/0256845 | A1 | 12/2004 | Damm | |
| 2006/0071461 | A1 | 4/2006 | Williams | |
| 2006/0290117 | A1 | 12/2006 | Fischer et al. | |
| 2009/0309341 | A1 | 12/2009 | Pausch | |
| 2011/0148085 | A1 | 6/2011 | Fukawatase et al. | |
| 2012/0292897 | A1 | 11/2012 | Puzzonia | |
| 2015/0115580 | A1 | 4/2015 | Gould et al. | |
| 2015/0239424 | A1 | 8/2015 | Nebel et al. | |
| 2015/0314747 | A1 * | 11/2015 | Weber | B60R 21/239 280/728.3 |

FOREIGN PATENT DOCUMENTS

| | | |
|---|---|---|
| DE | 10 2008 028 389 A1 | 12/2009 |
| DE | 10 2008 039 675 A1 | 3/2010 |
| DE | 10 2009 055 266 A1 | 6/2011 |
| DE | 10 2011 015 309 A1 | 10/2012 |
| EP | WO 2012/130445 A1 | 10/2012 |
| JP | H11321506 A | 11/1999 |
| WO | 2011/157631 A1 | 12/2011 |

OTHER PUBLICATIONS

German Examination Report—Aug. 9, 2013.

* cited by examiner

AIRBAG MODULE WITH AN ADAPTIVE INFLUENCING DEVICE

CROSS REFERENCE TO RELATED APPLICATIONS

This application claims priority to German Patent Application No. 10 2012 016 460.2, filed on Aug. 18, 2012 and PCT International Patent Application No. PCT/EP2013/002412, filed on Aug. 12, 2013.

FIELD OF THE INVENTION

The invention relates to an airbag module having an adaptive influencing device.

BACKGROUND

Almost every airbag, in particular every front airbag, has a ventilation device through which gas can escape from the gas compartment enclosed by the outer shell of the gasbag—hereinafter first gas compartment—when the person to be protected impacts thereon, so that the kinetic energy of the person to be protected is dissipated, and the person to be protected does not simply rebound from the airbag shell of the airbag. In the simplest case such a ventilation device is merely a ventilation opening, in particular a ventilation opening in the airbag shell.

In order to take into account different accident situations and/or the weight of the person to be protected, adaptive influencing devices to influence the shape of the airbag or the pressure in the gas compartment have been known in the prior art. A detachable retaining strap may be provided if the shape of the airbag is to be influenced. Furthermore, adaptive ventilation devices are known that have a throttle element in addition to the ventilation opening which throttles the gas flow through the ventilation opening more strongly in a first state than in a second state. As a rule, in this case the first state is the throttled or even closed state, and the second state is the less throttled, by way of example, the completely open state.

In some such airbag modules having an adaptive influencing device, an actuation device is also provided, which makes it possible to actively change the influencing device from its first state to its second state when an external signal is given. By way of example, a pyrotechnic actuator for this purpose is known from U.S. Pat. No. 6,648,371 B2. In this case, the first end of a tensioning strap is connected to the throttle element, and the second end of this tensioning strap is connected to a bolt of the actuator. In this case, the actuator is, in particular, held to the bottom of the housing of the airbag module. As long as the actuator is not actuated, the throttle element is thus connected to the bottom of the housing via the tensioning strap. When the shell of the airbag is completely expanded, the tensioning strap is in a tensioned state which keeps the throttle element in its first state. When the actuator is actuated, the bolt holding the second end of the tensioning element is dislodged by means of a pyrotechnic load, the tensioning element loses its tension and the throttle element changes to its second, namely unthrottled state. This technique basically functions very well, but has the disadvantage that parts like the bolt can fly around inside the gas compartment of the airbag shell, and that open flames can occur inside the shell of the airbag due to the pyrotechnic load. Furthermore, the pyrotechnic load feeds additional gas into the gas compartment of the airbag shell, which is not always desirable.

The generic DE 10 2005 039 418 B4 proposes an airbag module with an adaptive ventilation device, in which the actuation unit is formed by a "small airbag module inside the airbag module". In this case, the throttle element can be influenced by a second, small airbag inside the gas compartment of the actual shell of the airbag. The shell of this second airbag module—hereinafter the second shell—encloses a second gas compartment which can be filled with gas by a generator having the shape of a squib. If this occurs, the second shell filled with gas lifts the throttle element in the shape of a flap from the ventilation opening, so that the ventilation device changes to its second, unthrottled state. This has the disadvantage that the second shell and the ventilation opening must be immediately adjacent to one another, which is frequently only very difficult to realize. In particular, it is scarcely possible to provide the ventilation opening in the shell of the airbag.

On this basis, the object of the present invention is to further develop a generic airbag module such that a large structural and functional flexibility is provided. In the case when the adaptive influencing device is an adaptive ventilation device, it should, in particular, be possible to provide the ventilation opening in a section of the airbag shell. This airbag shell can be an outer shell, which separates the first gas compartment from the environment, or a partition shell that separates two chambers from one another. Hereinafter, this shell will therefore be referred to as the "first shell".

SUMMARY AND INTRODUCTORY DESCRIPTION

The above described object is attained by means of an airbag module as described herein and illustrated in the appended drawings.

A tensioning element is provided whose first end is coupled to the adaptive influencing device or forms the adaptive influencing device, and whose second end is coupled to the second shell of the actuation device when the second gas compartment is not filled, and decoupled from the second shell when the second gas compartment is filled.

In the case of an adaptive ventilation device, the second shell does not directly influence the throttle element, but by means of the tensioning element, whose first end is coupled to the throttle element or forms the throttle element, and whose second end is coupled to the second shell when the gas compartment of the second shell is not filled and decoupled from the second shell when the gas compartment of the second shell is filled. As a result of this, all advantages of the generic airbag module are preserved, but without having to accept its disadvantages.

Another advantage of the airbag module according to the present invention is that the actuation unit, consisting of the second shell and its dedicated gas source, can be realized as a standard assembly that can be used for a plurality of different airbag geometries, airbag internal pressures and applications. It is in particular possible to use this standard assembly as an actuation unit of an adaptive ventilation unit as well as an actuation unit in a dual depth airbag. This is not the case in the actuation unit of the generic DE 10 2005 039 418 B4.

So as not to require additional installation space and to ensure that the second shell can expand completely without problems, the second shell can be arranged completely inside the gas compartment enclosed by the first airbag shell. It is also possible, however, to arrange the second shell completely outside the gas compartment enclosed by the first airbag shell module.

It is possible both to configure the second shell in such a manner that it remains completely closed after filling and to configure it in such a manner that it opens while it is filled. Depending on the specific circumstances, both can be advantageous.

In a first preferred embodiment, the second end of the tensioning element is connected via a break connection to the second shell as long as its second gas compartment is not filled. This break connection is configured in such a manner that it breaks when the second gas compartment is filled with gas, and thus the second shell is expanded. In this case, the break connection can in particular be configured as a tear seam. This embodiment has the advantage of very simple manufacturability and low weight.

In a second preferred embodiment, the second end of the tensioning element is configured as a loop, which extends around the second shell when the second gas compartment is not filled. In this case, the circumference of the loop is shorter than the maximum circumference of the second shell when the second gas compartment is filled, so that the loop is opened by the expanding second shell. Here, the second shell can in particular be configured of metal foil, which has the advantage of high resistance, in particular also to the hot gases which fill the first gas compartment.

The second shell can be configured completely separately. But it is also possible that a section of the first shell or a section of a reinforcement layer of the first shell form a part of the second shell.

As already mentioned, activation of an adaptive ventilation device is an important application of the invention. But actively influencing the shape of the airbag shell (dual depth), for example, is also possible.

BRIEF DESCRIPTION OF THE DRAWINGS

The invention will now be explained in more detail with reference to preferred exemplary embodiments, in which.

FURTHER DESCRIPTION OF THE INVENTION

The invention will now be explained with reference to an exemplary application in which the adaptive influencing device is an adaptive ventilation device.

Figure 1:
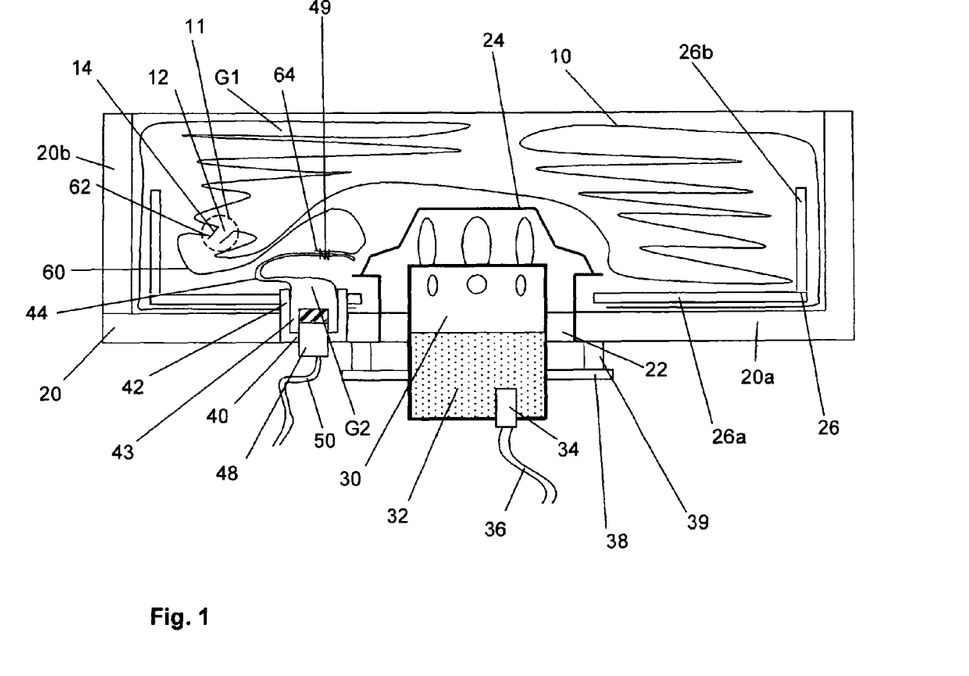
FIG. 1 is a schematic sectional view of a first embodiment of an airbag module according to the present invention in the idle state.
Figure 2:
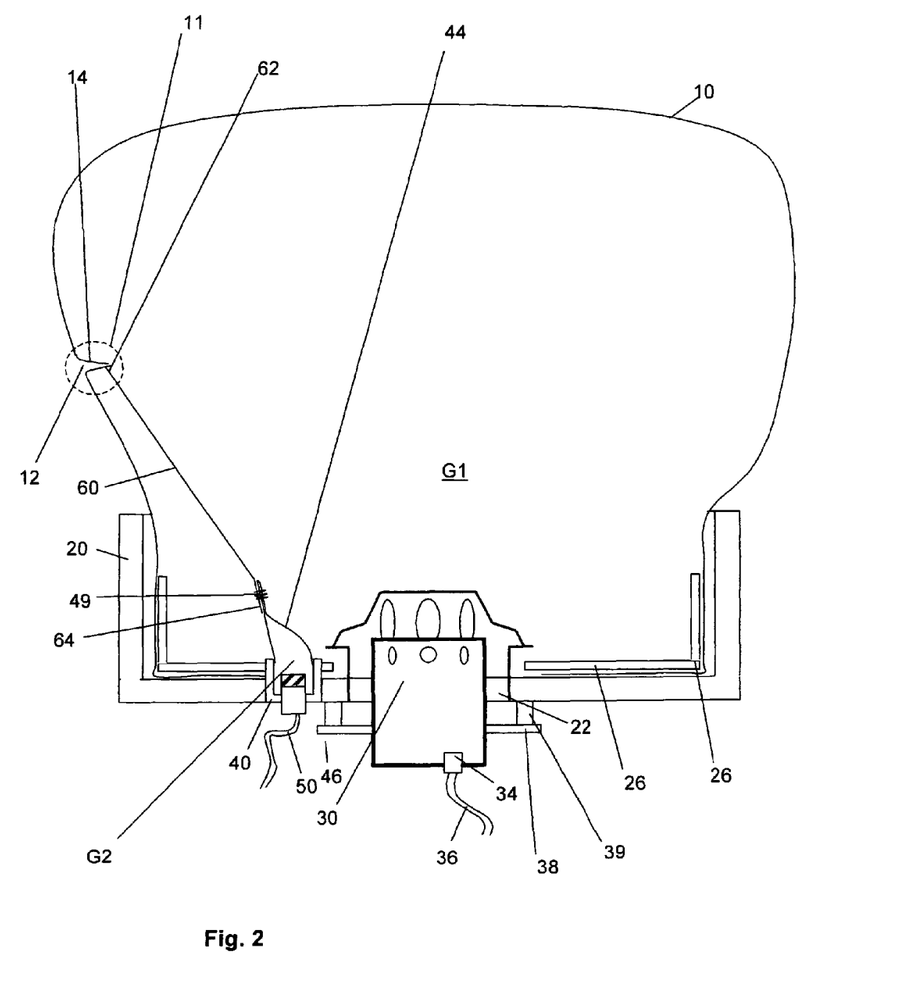
FIG. 2 shows the above embodiment after ignition of the gas generator and filling of the first gas compartment which is enclosed by the airbag shell, designated here as the first shell, but with the ventilation device still being in a throttled state.
Figure 3:
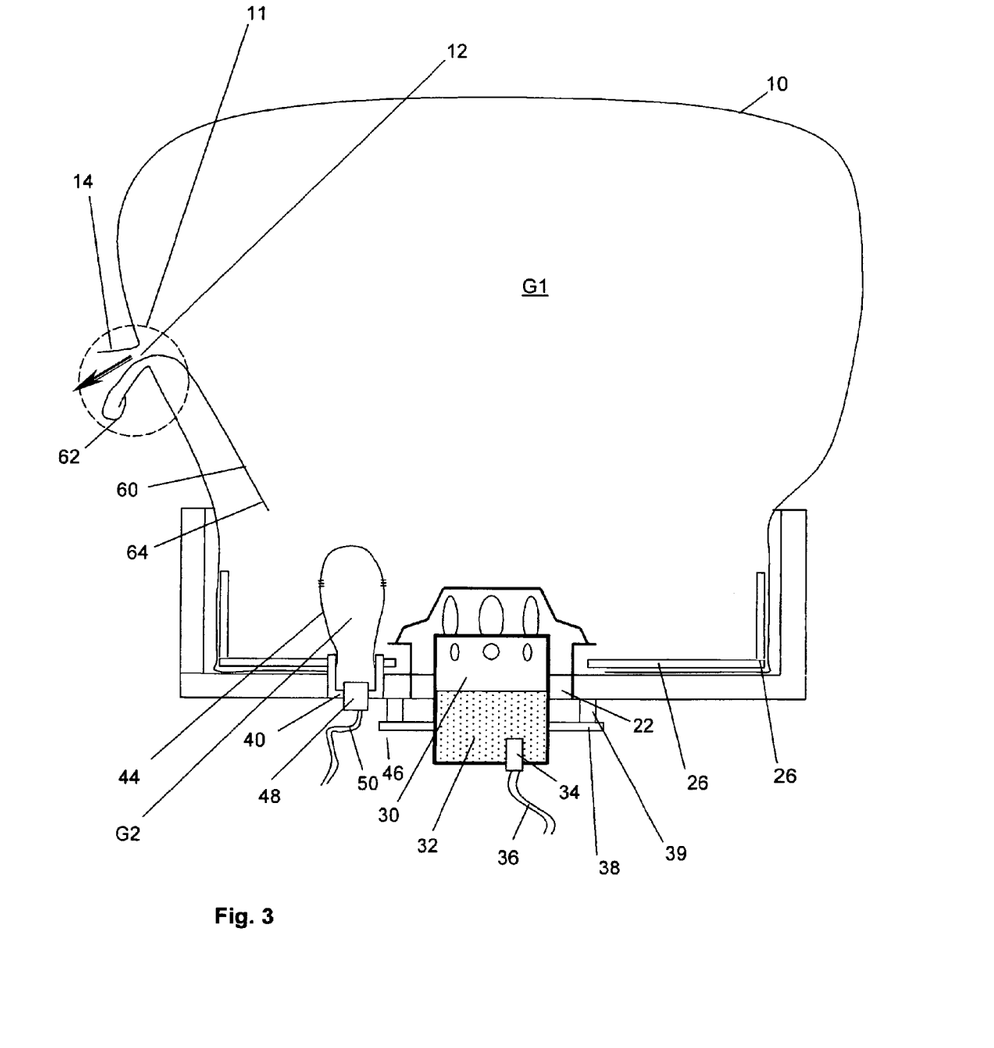
FIG. 3 shows the embodiment of FIG. 2 after actuation of an activation unit, as a result of which the ventilation device has changed to an unthrottled state.

FIGS. 1 to 3 show a front airbag module, namely a driver front airbag module for installation in the hub area of a steering wheel, which is basically configured in the usual manner. It has a housing 20 with a housing wall 20b and a housing bottom 20a, into which the airbag shell, designated here as the first shell 10, is folded in an idle state. This first shell 10 encloses a first gas compartment G1. The first shell 10 is held on the housing bottom 20a by means of a retaining and deflector element 26, for which purpose the retaining and deflector element 26 has a bottom 26a, with an enclosing side wall 26b extending therefrom. A first inflator, namely a gas generator 30, is used for filling the first gas compartment. In the shown exemplary embodiment, this gas generator 30 extends through an opening 22 in the housing bottom 20a and through a perforation in the bottom of the retaining and deflector element 26 into the inside of the housing 20 and thus into the first gas compartment G1. This gas generator 30 has a propelling charge 32 in the usual manner, which is ignited by the first squib 34 as soon as the latter is electrically ignited by an ignition lead 36. The upper part of the gas generator 30 has outlet openings for the generated gas; this part of the gas generator 30 is spanned by a diffuser 24. In the shown exemplar embodiment, the connection between the gas generator 30 and the housing body 20a is formed via a flange 38 of the gas generator and by a damper 39.

An adaptive ventilation device 11 is provided on the first shell 10, via which the first gas compartment G1 can be vented. A second, in particular non-adaptive ventilation device, particularly in the shape of a hole, can be provided in the first shell. This is not shown, however. The adaptive ventilation device 11 has a ventilation opening 12, and in the shown exemplary embodiment, a nozzle that encloses the ventilation opening 12. This nozzle 14 forms the throttle element of the adaptive ventilation device 11. A tensioning element is provided in the shape of a tensioning strap 60, whose first end 62 extends around the end of the nozzle 14 facing away from the first shell 10 in such a manner that the nozzle 14 is tightened when the tensioning strap 60 is under tension, so that the ventilation device is closed or at least throttled in this state. If the gas compartment G1 is filled with gas and the tensioning strap 60 is not under tension, the nozzle is turned outward by the pressure prevailing in the first gas compartment, and the ventilation device changes to its unthrottled state. Such a ventilation device has been described in detail in document US 2006/0071461 A1, for example, which is hereby referred to, so that the exact configuration of this ventilation device need not be described in more detail.

In an initial state, the second end 64 of the tensioning strap 60 is connected to an element of an actuation unit 40. The actuation unit 40 is used to change the ventilation device 11 (that is, the nozzle 14) from a first state, namely throttled, to a second state, namely unthrottled, when the first shell 10 is expanded. This actuation unit 40 is configured as follows:

The actuation unit 40 has a second housing 42, which extends through the housing bottom 20a into the first gas compartment G1 and is open thereto. Secured to this second housing 42 is a second squib 48, whose propelling charge is located in the cavity 43 of the second housing. An ignition lead, namely ignition lead 50, likewise extends from this second squib. The second squib 48 is used as a gas source of the actuation element 40. A second shell 44 is tightly connected to the second housing 42 that encloses a second gas compartment G2, which can be filled by the gas of the second squib 48. This second shell 44 can consist of a conventional airbag fabric. Thus the actuation unit 40 forms a sort of small airbag module inside the actual airbag module. The second end 64 of the strap 60 is sewn to the second shell 44 in such a manner that the seam, namely the tear seam 49, holds together two layers of the second shell 44. Thus there are three layers in sections, namely the second end 64 of the tensioning strap 60, as well as two layers of the second shell 44. This will be seen again later on in more detail with reference to FIG. 4.

When the gas generator 30 is ignited, the gas flows into the first gas compartment G1 and the first shell 10 expands in the usual manner. In this case, the tensioning strap 60 tightens, as a result of which the nozzle 14 is constricted and little if any gas can escape through the ventilation opening 12, so that the ventilation device is in a first, throttled state. The state of the nozzle 14 forming the throttle element is also designated here as the first state (FIG. 2).

If the second squib 48 is now ignited, the gas it generates fills the second gas compartment G2, causing the second shell 44 to expand. The tear seam is torn by this expansion, and the second end 64 of the tensioning strap 60 is thus separated from the second shell 44. In this way, the strap 60 can no longer absorb tensile forces, and the nozzle 14 is turned outward by the pressure prevailing in the first gas compartment, as a result of which the ventilation opening 12 is released, and the ventilation device and thus also the nozzle 14 change to a second, namely unthrottled, state. The second shell 44 stays closed, so that the second squib 48 and the gas it generates cannot interact with other elements of the airbag module. (FIG. 3).

Figure 4:
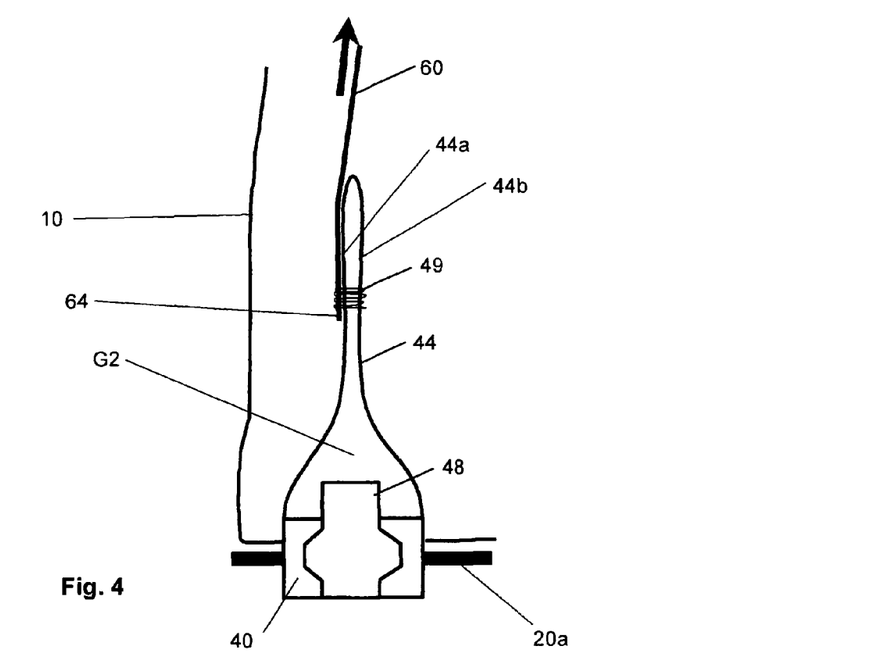
FIG. 4 shows an activation unit, which is similar to the one shown in FIGS. 1 to 3, in a state corresponding to FIG. 2.
Figure 5:
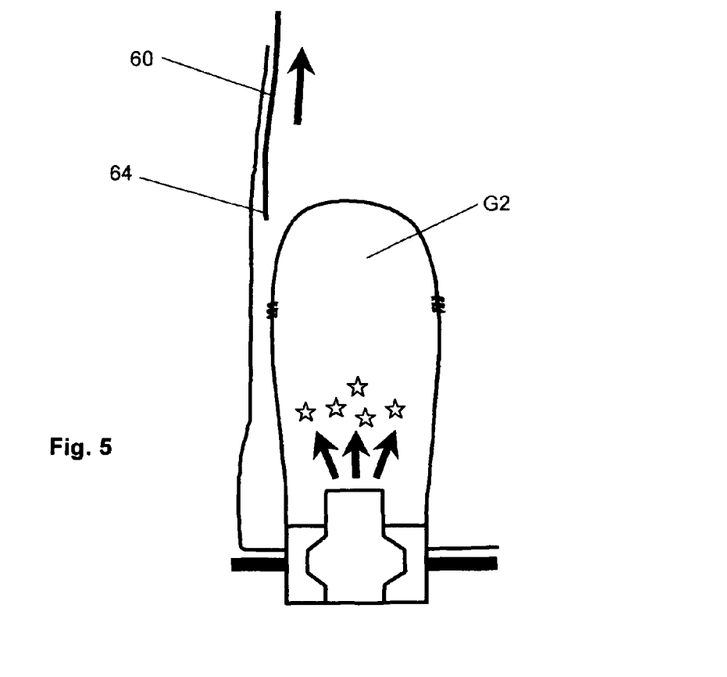
FIG. 5 shows the actuation unit of FIG. 4 in a state corresponding to FIG. 3.

FIGS. 4 and 5 once again show a very similar actuation unit 40, but this one does not have a real housing. Its function is identical to that described above, FIG. 4 showing the state of FIG. 2 and FIG. 5 the state of FIG. 3. In particular, it is possible to see the tensioning strap 60 sewn to the two layers 44a, 44b of the second shell in the initial status (FIG. 4).

Figure 6:
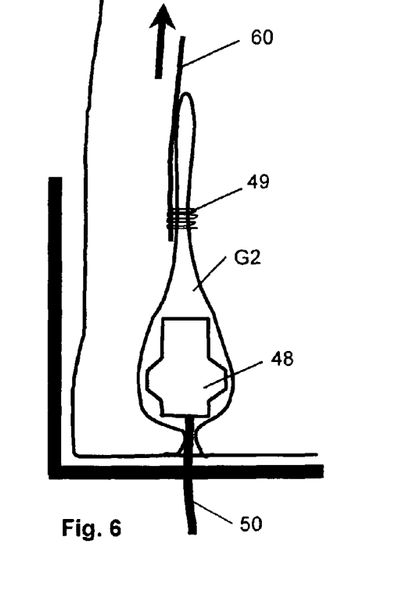
FIG. 6 is a variation of the exemplary embodiment shown in FIG. 4.
Figure 7:
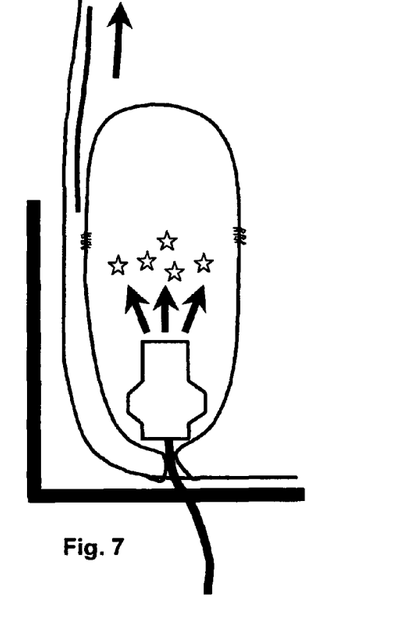
FIG. 7 represents the exemplary embodiment shown in FIG. 6 in a state corresponding to FIG. 5.

FIGS. 6 and 7 show a variation of what has just been described above. In this case, the actuation unit 40 does not have a housing-like component, but the second squib 48 used as an inflator is held solely by its ignition lead 50. This can simplify the manufacture of the airbag module because no changes must be made to the housing 20 of a conventional airbag module.

Figure 8:
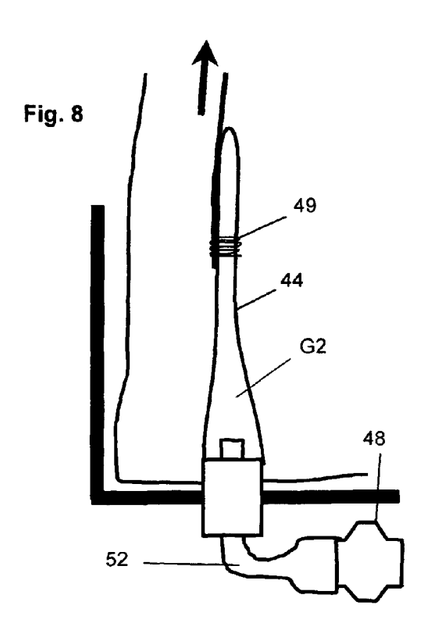
FIG. 8 is a further variation of the exemplary embodiment shown in FIG. 4.
Figure 9:
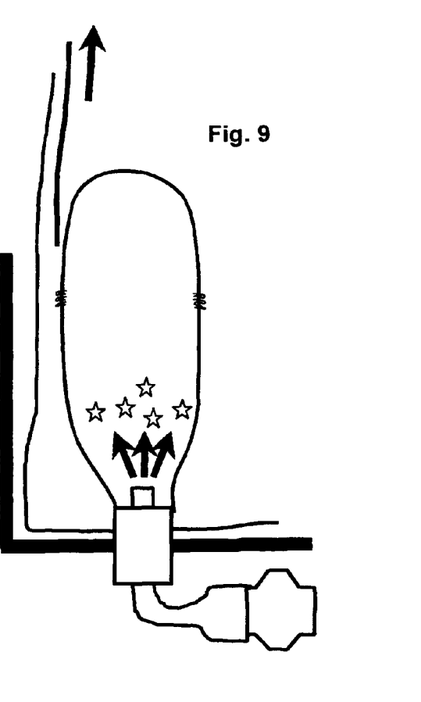
FIG. 9 represents the exemplary embodiment shown in FIG. 8 in a state corresponding to FIG. 5.

FIGS. 8 and 9 show another variation. Here, the squib 48 used as an inflator is located outside the second shell 44 and is connected to the second gas compartment G2 by means of a tubular gas conduction element 52.

In the first exemplary embodiment, the second shell 44 can be woven in one piece ("one piece woven").

Figure 10:
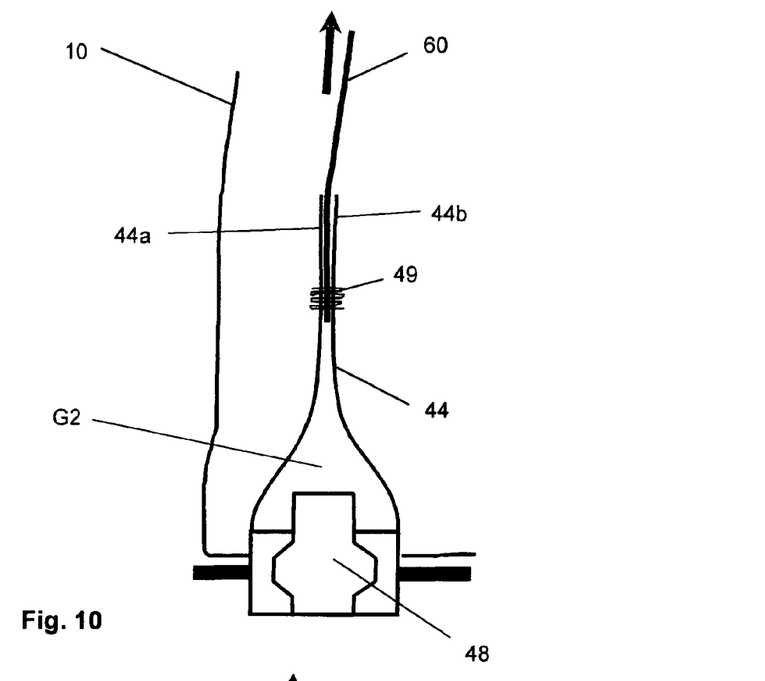
FIG. 10 is a second exemplary embodiment of the first embodiment of an actuation unit in a state corresponding to FIG. 4.
Figure 11:
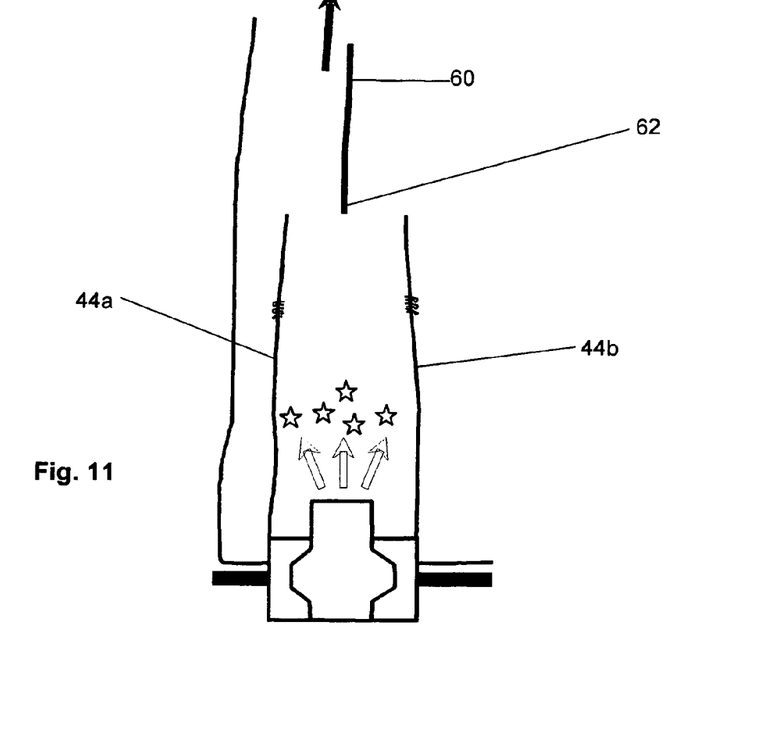
FIG. 11 shows the actuation unit of FIG. 10 in a state corresponding to FIG. 5.

FIGS. 10 and 11 show a second exemplary embodiment of the first embodiment of the actuation unit 40. In this case, the second end of the strap 60 extends between two layers 44a and 44b of the second shell 44, to which it is likewise sewn by means of a tear seam 49. Here again there is a three-part configuration, but the sequence of layers is different than in the first exemplary embodiment, although a sequence of layers similar to the first exemplary embodiment could also be possible. First of all, here again the second shell 44 is closed and encloses a second gas compartment G2. If the second squib 48 is ignited, and the second gas compartment G2 is consequently filled with gas, here again both layers of the second shell 44 are separated by the gas pressure, as a result of which the tear seam is torn and the second end 62 of the strap 60 is released. Here the second shell 44 is opened after the release of the second end of the tensioning strap 60 and the gas can enter the first gas compartment G1.

Figure 12:
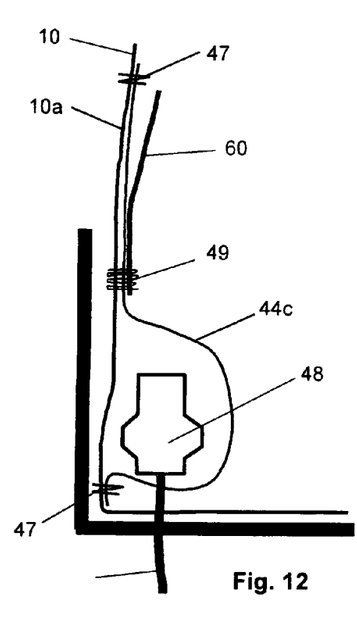
FIG. 12 is a third exemplary embodiment of the first embodiment of an actuation unit in a state corresponding to FIG. 4.
Figure 13:
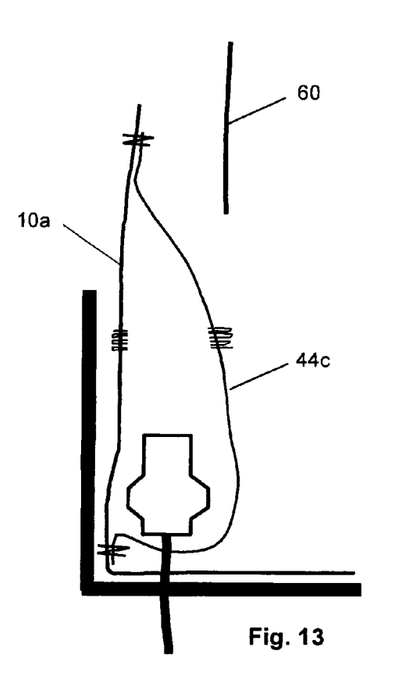
FIG. 13 represents the exemplary embodiment shown in FIG. 12 in a state corresponding to FIG. 5.

FIGS. 12 and 13 show a third exemplary embodiment of the first embodiment of the invention. Here, the first shell and the second shell are not completely separated from one another, but "share" a section 10a of the first shell 10, to which a layer 44c of the second shell 44 is attached by means of a closed, permanent seam 47. Appropriate gluing, welding or the like would of course be possible as well. In addition, here also a tear seam 49 is provided, which connects the tensioning strap 60, the section 10a of the first shell and the layer 44c of the second shell to one another. The functional principle is similar to that shown in FIGS. 6 and 7. Instead of a section of the first shell, a section of a reinforcement layer thereof could also be used. In this exemplary embodiment, it is preferable to hold the squib (as shown in FIGS. 6 and 7) by its ignition lead 50 only.

Figure 14:
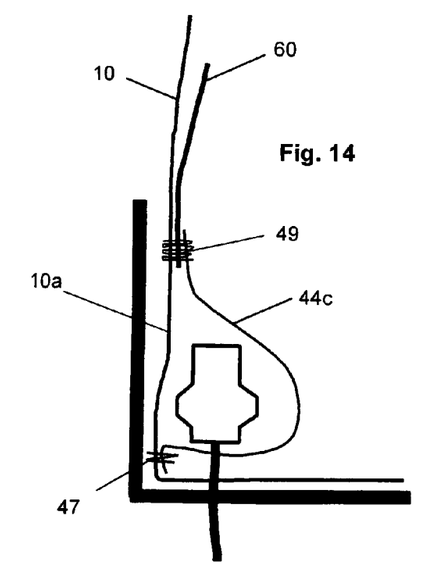
FIG. 14 is a variation of the exemplary embodiment shown in FIG. 12.
Figure 15:
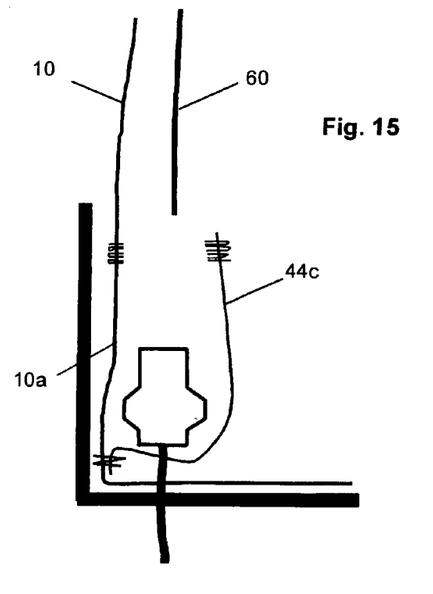
FIG. 15 represents the exemplary embodiment shown in FIG. 12 in a state corresponding to FIG. 5.

FIGS. 14 and 15 show a variant of the third exemplary embodiment that functions similarly to the second exemplary embodiment (FIGS. 10 and 11). Here again the first shell 10 and the second shell 44 "share" a section 10a of the first shell 10, to which a layer 14c of the second shell 44 is sewn. Here the permanent seam 47 and the tear seam form a permanent connection in the initial state, which connection breaks along the tear seam when the second squib 44 is ignited. The second end 64 of the tensioning strap 40 [sic] can be held between the section 10a of the first shell 10 and the layer 44c of the second shell by means of the tear seam 44.

Figure 16:
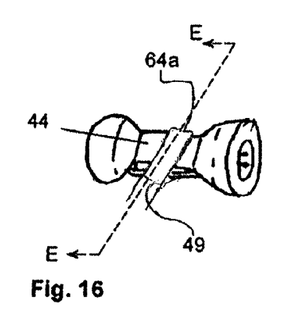
FIG. 16 is a perspective view of a second embodiment of an actuation unit.
Figure 17:
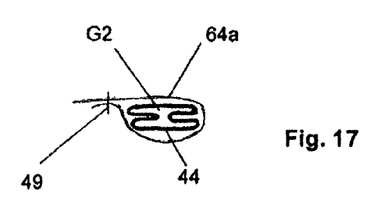
FIG. 17 shows a cross-section along the plane E-E of FIG. 16.
Figure 18:
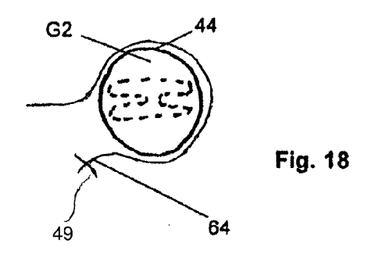
FIG. 18 is the cross-section shown in FIG. 17 after ignition of the actuation unit.

A second embodiment of the actuation unit 40 will now also be described with reference to FIGS. 16 to 18. Here the second shell 44 is preferably a thin metal sheet, which is folded in the initial state shown in FIGS. 16 and 17. The second end 64 of the strap 60 is configured as a loop 64a that extends around the second shell 44, which preferably has an essentially oblong section for this purpose.

The loop 64a is held together by a tear seam 49 here as well, by means of which the tensioning strap 60 is connected to itself. If now the second squib (of which only the connecting pins are visible in FIG. 16) located inside the second shell 44 is ignited, then the second shell 44 expands, in particular enlarging its diameter, as shown in FIG. 18. This diameter is larger than the free inner diameter of the loop 64a, as a result of which the tear seam 49 is torn. Thereafter, the second end of the strap 60 is released, and as a result the ventilation device changes to its second, unthrottled state. In order to illustrate the functional principle, the initial shape of the second shell 44 is drawn with dashed lines in FIG. 18.

Figure 19:
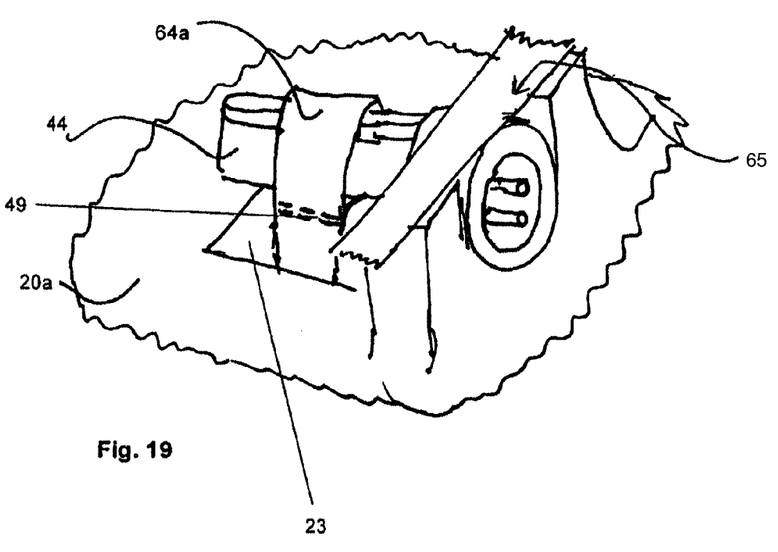
FIG. 19 represents an actuation unit similar to that of FIG. 8 in an assembled state.

FIG. 19 shows how a second shell 44 according to the just described second embodiment can be arranged outside on the housing bottom 20a and the tensioning strap 60 extends through a corresponding perforation 23 in the housing bottom. In this case, both ends of the second shell 44 can be supported on the housing bottom. In this case, the end of the second shell 44 carrying the squib is held in a receptacle and secured by a bracket 65, for example. This is only represented symbolically in FIG. 11, however. The perforation 23 is used in this case as another ventilation device, namely as a non-adaptive ventilation device.

Figure 20:
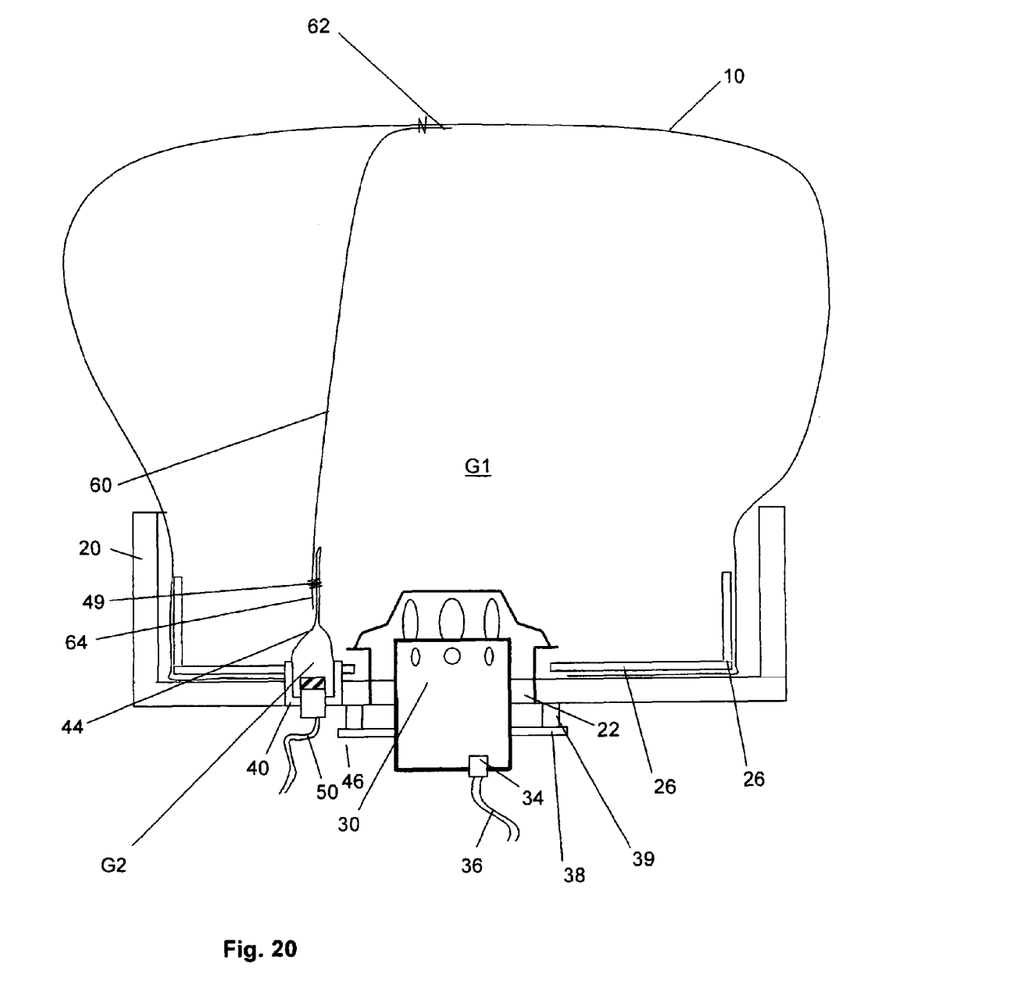
FIG. 20 represents a second exemplary application of the invention in a state corresponding to FIG. 2.
Figure 21:
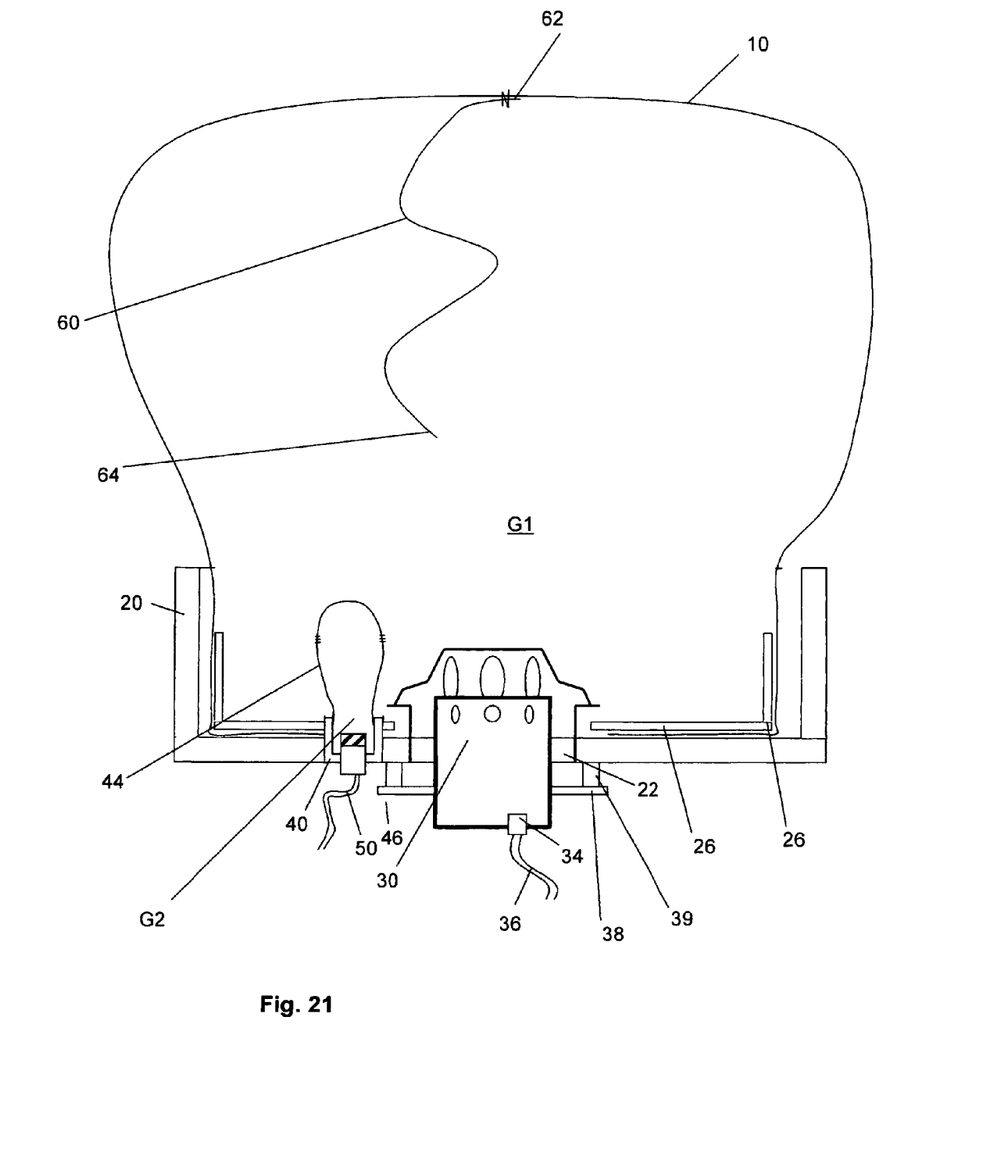
FIG. 21 represents the exemplary application shown in FIG. 20 in a state corresponding to FIG. 3.

The invention has so far been described with reference to an application, in which the actuation unit 40 influences the state of an adaptive ventilation device. This is a very important application, but other applications are likewise possible, in particular influencing the shape and particularly the depth of the first shell, which is shown in FIGS. 20 and 21. Here the first end 62 of the tensioning strap 60 acting in this case as an arrester strap is directly connected in a permanent manner to the first shell 10. Prior to the ignition of the second squib 48 (that is, prior to the activation of the actuation unit 40) there is a reduced maximum expansion of the first shell (FIG. 20), and a full maximum expansion of the first shell 10 (FIG. 21) ("dual depth") results after the ignition of the second squib 50. All the previously described embodiments and exemplary embodiments of the actuation unit 40 can also be used for this application.

While the above description constitutes the preferred embodiment of the present invention, it will be appreciated that the invention is susceptible to modification, variation and change without departing from the proper scope and fair meaning of the accompanying claims.

The invention claimed is:

1. An airbag module comprising:
   a first shell enclosing a first gas compartment, the first shell having a compressed state and an expanded state;
   a first inflator for filling the first gas compartment,
   an adaptive influencing device, for actively influencing ventilation of the first gas compartment or the shape of the first shell,
   an actuation unit for actuating the influencing device, the actuation unit having a second shell enclosing a second gas compartment, the second shell having a compressed state and an expanded state, and a gas source for filling the second gas compartment, wherein a state of the influencing device changes when the second gas compartment is filled by the gas source and the second shell transitions from the compressed state to the expanded state, and
   a tensioning element, which is a separate component from the second shell, the tensioning element having a first end coupled to the adaptive influencing device, or forms at least a portion of the adaptive influencing device, and having a second end coupled to the second shell of the actuation device when the second gas compartment is not filled by the gas source, and the tensioning element is decoupled from the second shell when the second gas compartment is filled by the gas source;
   wherein gas from the second gas compartment will not vent external to the first shell.

2. The airbag module according to claim 1 further comprising in that the gas source is a second inflator that is independent from the first inflator, the second inflator being arranged inside the second gas compartment, or connected thereto by means of a gas conduction element.

3. The airbag module according to claim 2, further comprising in that the second inflator includes a squib arranged inside the second gas compartment.

4. The airbag module according to claim 3, further comprising in that the squib is held by an ignition lead.

5. The airbag module according to claim 1 further comprising in that the second shell remains closed after filling of the second gas compartment by the gas source.

6. The airbag module according to claim 1 further comprising in that the second shell opens and vents into the first shell when the second gas compartment is filled.

7. The airbag module according to claim 1 further comprising in that the second end of the tensioning element is connected to the second shell via a break connection as long as the second gas compartment is not filled.

8. The airbag module according to claim 1 further comprising in that the first shell and the second shell are completely separated from one another.

9. The airbag module according to claim 1 further comprising in that the adaptive influencing device is an adaptive ventilation device for ventilating the first gas compartment which has at least one ventilation opening and at least one throttle element, which, in a first state, throttles the gas flow through the ventilation opening more strongly than in a second state, wherein the state of the throttle element changes when the second gas compartment is filled by the gas source.

10. The airbag module according to claim 9, further comprising in that the ventilation opening is located in the first shell.

11. The airbag module according to claim 9 further comprising in that at least a second non-adaptive ventilation device is provided.

12. The airbag module according to claim 9 further comprising that the throttle element is substantially open in the second state to increase ventilation of the first gas compartment.

13. The airbag module according to claim 1 further comprising in that the first end of the tensioning element is directly connected to the first shell.

14. The airbag module according to claim 1 further comprising wherein the airbag module is a driver front airbag module.

15. The airbag module of claim 1, wherein the tensioning element is non- inflatable.

16. An airbag module comprising:
   a first shell enclosing a first gas compartment, a first inflator for filling the first gas compartment,
   an adaptive influencing device, for actively influencing ventilation of the first gas compartment or the shape of the first shell,
   an actuation unit for actuating the influencing device, the actuation unit having a second shell enclosing a second gas compartment, and a gas source for filling the second gas compartment, wherein a state of the influencing device changes when the second gas compartment is filled by the gas source, and
   a tensioning element, which is a separate component from the second shell, the tensioning element having a first end coupled to the adaptive influencing device, or forms at least a portion of the adaptive influencing device, and having a second end coupled to the second shell of the actuation device when the second gas compartment is not filled by the gas source, and the tensioning element is decoupled from the second shell when the second gas compartment is filled by the gas source;
   wherein the second shell is completely arranged inside the first gas compartment.

17. An airbag module comprising:
   a first shell enclosing a first gas compartment, the first shell having a compressed state and an expanded state;
   a first inflator for filling the first gas compartment, an adaptive influencing device, for actively influencing ventilation of the first gas compartment or the shape of the first shell, an actuation unit for actuating the influencing device, the actuation unit having a second shell enclosing a second gas compartment, the second shell having a compressed state and an expanded state, and a gas source for filling the second gas compartment, wherein a state of the influencing device changes when the second gas compartment is filled by the gas source and the second shell transitions from the compressed state to the expanded state, and a tensioning element having a first end coupled to the adaptive influencing device, or forms at least a portion of the adaptive influencing device, and having a second end coupled to the second shell of the actuation device when the second pas compartment is not filled by the gas source, and is decoupled from the second shell when the second gas compartment is filled by the gas source;

wherein gas from the second gas compartment will not vent external to the first shell;

wherein the second shell is completely arranged outside the first gas compartment.

18. An airbag module comprising:

a first shell enclosing a first gas compartment, the first shell having a compressed state and an expanded state;

a first inflator for filling the first gas compartment, an adaptive influencing device, for actively influencing ventilation of the first gas compartment or the shape of the first shell, an actuation unit for actuating the influencing device, the actuation unit having a second shell enclosing a second gas compartment, the second shell having a compressed state and an expanded state, and a gas source for filling the second gas compartment, wherein a state of the influencing device changes when the second gas compartment is filled by the gas source and the second shell transitions from the compressed state to the expanded state, and a tensioning element having a first end coupled to the adaptive influencing device, or forms at least a portion of the adaptive influencing device, and having a second end coupled to the second shell of the actuation device when the second pas compartment is not filled by the gas source, and is decoupled from the second shell when the second gas compartment is filled by the gas source;

wherein gas from the second gas compartment will not vent external to the first shell;

wherein the second end of the tensioning element is formed as a loop which extends around the second shell when the second gas compartment is not filled, and is opened by expanding the second shell when the second gas compartment is filled.

19. An airbag module comprising:

a first shell enclosing a first gas compartment, a first inflator for filling the first gas compartment, an adaptive influencing device, for actively influencing ventilation of the first gas compartment or the shape of the first shell, an actuation unit for actuating the influencing device, the actuation unit having a second shell enclosing a second gas compartment, and a gas source for filling the second gas compartment, wherein a state of the influencing device changes when the second gas compartment is filled by the gas source, and a tensioning element, which is a separate component from the second shell, the tensioning element having a first end coupled to the adaptive influencing device, or forms at least a portion of the adaptive influencing device, and having a second end coupled to the second shell of the actuation device when the second gas compartment is not filled by the gas source, and the tensioning element is decoupled from the second shell when the second gas compartment is filled by the gas source;

wherein the second end of the tensioning element is connected to the second shell via a break connection as long as the second gas compartment is not filled; and wherein the break connection is a tear seam which extends over the tensioning element and two layers of the second shell.

20. The airbag module according to claim 1 further comprising in that An airbag module comprising:

a first shell enclosing a first gas compartment, the first shell having a compressed state and an expanded state;

a first inflator for filling the first gas compartment, an adaptive influencing device, for actively influencing ventilation of the first pas compartment or the shape of the first shell, an actuation unit for actuating the influencing device, the actuation unit having a second shell enclosing a second gas compartment, the second shell having a compressed state and an expanded state, and a gas source for filling the second gas compartment, wherein a state of the influencing device changes when the second gas compartment is filled by the gas source and the second shell transitions from the compressed state to the expanded state, and a tensioning element having a first end coupled to the adaptive influencing device, or forms at least a portion of the adaptive influencing device, and having a second end coupled to the second shell of the actuation device when the second gas compartment is not filled by the gas source, and is decoupled from the second shell when the second gas compartment is filled by the gas source;

wherein gas from the second gas compartment will not vent external to the first shell;

wherein a section of the first shell or a section of a reinforcement layer of the first shell forms a part of the second shell.

* * * * *